United States Patent [19]

Doki et al.

[11] Patent Number: 4,649,359

[45] Date of Patent: Mar. 10, 1987

[54] EXPLOSION-PROOF ELECTRO-DISPLACEMENT CONVERTER DEVICE

[75] Inventors: Yoshikuni Doki, Yokohama; Masatoshi Fujiwara, Yokosuka; Tatsuhide Shiga, Zushi; Yohsuke Shono, Hon-Machi-Nishi; Mikio Tanaka, Nasemachi; Yoshihiro Tsuruoka, Fujisawa, all of Japan

[73] Assignee: Yamatake-Honeywell Co. Ltd., Tokyo, Japan

[21] Appl. No.: 734,320

[22] Filed: Jul. 10, 1985

[51] Int. Cl.[4] ............................................. H01F 7/08
[52] U.S. Cl. .................................... 335/222; 335/229; 381/189
[58] Field of Search ............... 335/221, 222, 229, 230, 335/231, 232, 234, 236; 179/115 R, 115.5 BS, 115.5 VC, 115.5 DV

[56] References Cited

U.S. PATENT DOCUMENTS 2,556,816  6/1951  Lukacs ................................. 335/222
2,655,566  10/1953  Pittinger ..................... 179/115.5 BS Primary Examiner—Patrick R. Salce
Attorney, Agent, or Firm—Mitchell J. Halista; Trevor B. Joike

[57] ABSTRACT

An explosion-proof type electro-displacement converter device comprising a cylindrical first yoke attached through a permanent magnet which is at the center of the bottom of a bowl-shaped second yoke, an exciter coil winding supported elastically by springs and arranged in the magnetic path formed between the yokes, the opening of the bowl-shaped yoke is sealed by a sealing means, and an output stem linked with the exciter coil winding and projecting, leaving an explosion-proof gap, through an opening which penetrates through the bowl-shaped yoke or the sealing means.

12 Claims, 7 Drawing Figures

EXPLOSION-PROOF ELECTRO-DISPLACEMENT CONVERTER DEVICE

BACKGROUND OF THE INVENTION

1. This invention relates to an explosion-proof type electro-displacement converter and more particularly to an explosion-proof type electro-displacement converter device of a simplified structure to facilitate easy assembly and adjustment.

2. Description of the Prior Art

Conventional electro-displacement converter applicable to electropneumatic measuring instruments, such as electropneumatic converters, regulator valve electropneumatic positioners, etc. have been required to be explosion-proof even in an explosive gas environment. For this reason, a structure to enclose the whole electro-displacement converter device in an explosion-proof case has been used. However, there is an unavoidable handling disadvantage in such a structure. Since it was sometimes dangerous to detach a cover of the explosion-case for the purpose of adjustment, repairs or replacements. One prior art modification accommodates the whole drive unit (torque motor) including a core as a magnetic path and other parts including an exciter coil in a separate sealed container. In that case, one extra independent sealed container is required thereby producing an increase in the size of the equipment.

SUMMARY OF THE INVENTION

An object of the present invention is therefore to provide an improved explosion-proof type electro-displacement converter device. In accomplishing this and other objects, there is presented herein, in accordance with the present invention, an explosion-proof electro-displacement converter device comprising a cylindrical first yoke attached through a permanent magnet which is located at the center of a bowl-shaped yoke, an exciter coil winding supported elastically by spring means and arranged in a magnetic path formed between the yokes, the opening of the bowl-shaped yoke is sealed by a sealing means, and an output stem linked with the exciter coil winding and projecting, leaving an explosion-proof gap, through an opening which penetrates through the bowl-shaped yoke or the sealing means.

BRIEF DESCRIPTION OF THE DRAWINGS

A better understanding of the present invention may be had by reference to the following description in connection with the accompanying drawings, in which.

DESCRIPTION OF THE PREFERRED EMBODIMENT

Figures 1, 2, 3:
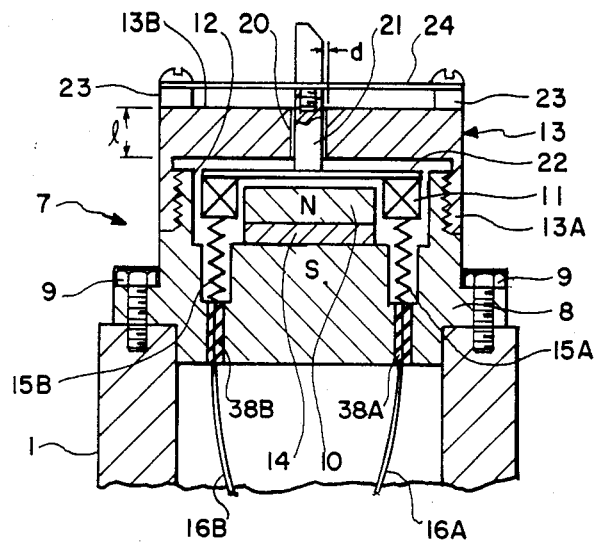
FIG. 1 is a cross-sectional illustration showing an embodiment of an explosion-proof type electro-displacement converter device in accordance with the present invention.
FIG. 2 is a top view of the stem support flat spring suitable for use in the device shown in FIG. 1.
FIG. 3 is a pictorial illustration of an electropneumatic positioner embodying the converter device shown in FIG. 1.

Referring to FIGS. 1 and 2 in more detail, element 1 is a cylindrical mount base for the associated equipment hardware (not illustrated herein), and the lower part of this base 1 is constructed with an ordinary explosion-proof structure for protecting the lead wires 16A and 16B. On the other hand, a first yoke 8 forming the electro/displacment converter device 7 is engaged and fixed tightly by a plurality of bolts 9 to an upper surface side opening of the mount base 1 whereby the side opening is sealed airtight. The first yoke 8 forms, together with a second yoke 10, described later, a magnetic circuit for an annular coil winding 11, and it also forms, together with a lid 13, an explosion-proof container. Since this explosion-proof container is substantially bowl-shaped, a concave cavity 12 which accommodates the coil winding 11 is formed at the upper side of the container. The second yoke 10 is cylindrical and is attached by any suitable means at the middle of the bowl-shaped yoke 8 through the permanent magnet 14, for example, through a hole or holes in the permanent magnet 14 (not shown). The permanent magnet 14 is formed as a disk and its top and bottom-surface sides are magnetized to be a North pole and a South pole, respectively.

The coil winding 11 is arranged in a space, which is in a magnetic path of the magnet 14, between an outer surface of the cylindrical yoke 10 and an inner surface of the bowl-shaped yoke 8 so that it intersects the magnetic path without making any mechanical contacts, and it can move freely in the vertical direction parallel to the magnetic axis of the magnet 14 while being elastically supported by a pair of coil springs 15A and 15B. One lead of the coil winding 11 is connected to the top of one coil spring 15A and the other lead of the winding 11 is connected to the top of the other coil spring 15B. The bottom of each of the coil springs 15A and 15B is led through the yoke 8 by means of the respective ones of lead wires 16A and 16B through electrically insulating and airtight glass feedthrough beads 38A and 38B, respectively.

The lid material 13 is formed by either a magnetic material or by a non-magnetic material and is attached by a threaded surface 13A to the outer circumference of the bowl-shaped yoke 8 whereby the top opening of the yoke 8 is sealed airtight. The threaded surface 13A of the lid 13 has a regular length in conformity with an explosion-proof standard and forms an explosion-proof container together with the bowl-shaped yoke 8. Penetrating the center of a top wall 13B of the lid 13 is an opening 20. An output stem 21, which moves upward and downward in association with the coil winding 11, penetrates through this opening 20 leaving an explosion-proof gap "d" therebetween. The top wall 13B also has a thickness (depth) to be in conformity with the explosion-proof standard.

The inner end of the output stem 21 is fixed to a fixture plate 22 while the outer end projects outside of the lid 13 so that a displacement output of the stem 21 is transmitted easily to the outside. The axis of the stem 21 is supported elastically by a stem support flat spring 24

(shown in FIG. 2) which is installed via the spacers 23 on the top surface of the lid 13. With the electro/displacement converter device having the above structure, in accordance with the present invention, it is possible to give a desired amount of displacement to the output stem 21 according to the theory of electromagnetic induction, by supplying a current signal corresponding to a measured value to the coil winding 11 through the lead wires 16A and 16B.

Referring to FIG. 3, the outside part of the output stem 21 is inserted into a case 25 shown in outline form. Note that a nozzle/flapper device 28,29 and a feedback device 31 are arranged in the case 25. The nozzle flapper device consists of a balance beam 28, whose one end is supported by a fulcrum 26 and whose other free end side is linked with the external extension of the output stem 21 by means of a coupling means 27, i.e., a cross spring, and is arranged to face a nozzle 29 which is adjacent to the balance beam 28. On the other hand, a feedback device or spring 31 is used to feed back a movement of a valve actuator 30 for a valve 30A to the balance beam 28 and is connected to one end of a feedback lever 34, whose middle part is supported by means of a fulcrum 37. The other end of the spring 31 is linked to the balance beam 28. The other end of the lever 34 is guided out of the case 25 and is linked to the pneumatic valve actuator 30 through a pin 32 riding in a slot 33. Pneumatic actuation pressure is supplied to the actuator 30 through piping 35 connected to a pressure amplifier 36 which receives supply pressure Psupply from a pressure source and amplifies the back pressure from the nozzle 29.

In operation of the above electropneumatic positioner, when the output stem 21 produces, for example, in response to a signal, an upward displacement which effects a rotation of the balance beam 28, e.g., clockwise, around the fulcrum 26 and opens the nozzle 29, resulting in a decrease in a nozzle back pressure. This nozzle back pressure is amplified by the amplifier 36 and is then applied to the actuator 30 to cause the actuator 30 to move the valve 30A in the OPEN direction and to cause, at the same time, the feedback lever 34 to be rotated counterclockwise around the fulcrum 37. A rotation or movement of the feedback lever 34 is transmitted, through the feedback spring 31, as a force to cause the balance beam 38 to be rotated and displaced counterclockwise. This force balances the clockwise force acting upon the balance beam 28 by means of the stem 21 of the electro/displacement converter, and thus, the movement of the balance beam 28 is stabilized.

Figure 4:
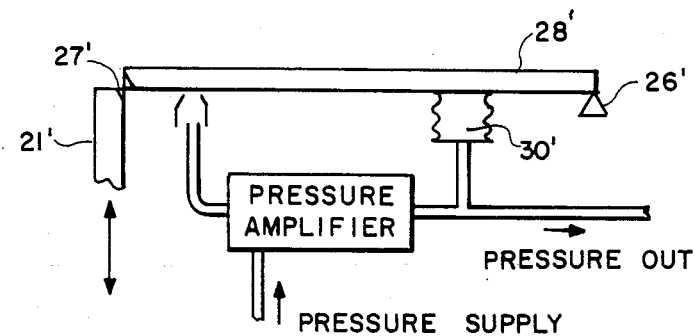
FIG. 4 is a pictorial illustration of an electropneumatic converter embodying the converter device shown in FIG. 1.
Figure 5:
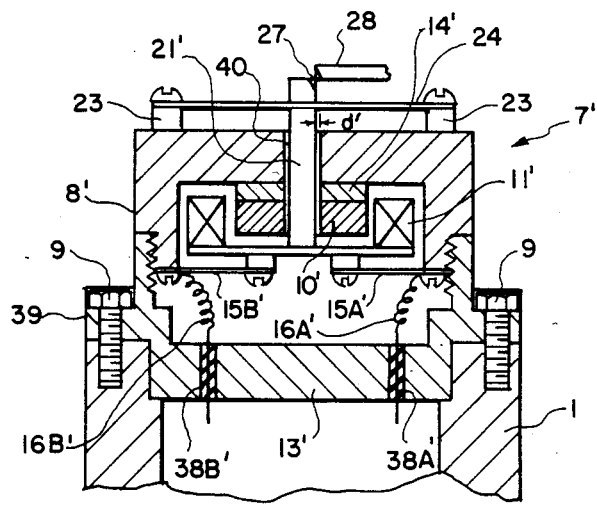
FIG. 5 is a cross-sectional illustration of a second embodiment of a converter device in accordance with the present invention.
Figure 6:
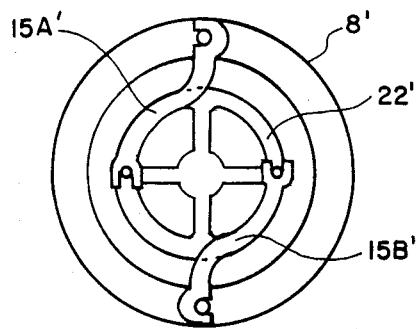
FIG. 6 is a top view of an electrical lead spring suitable for use in the device shown in FIG. 5.

FIG. 4 shows an example of the application of the electro/displacement converter in accordance with the present invention to an electropneumatic converter. A feedback force in this electropneumatic converter acts upon the beam 28' through the bellows 30' and contributes to the stabilization of the balance beam 28'. For the other parts and functions common to the embodiment shown in FIG. 3, corresponding numbers are used with the function explanations being similar. It is now understood that a pneumatic output Pout corresponding to an amount of the displacement of the stem 21' is obtainable by this device. FIG. 5 and FIG. 6 are each a partial cross-section, showing another embodiment in accordance with the present invention, and a top view of an electrical lead spring respectively. In this embodiment, a lid 13' and a bowl-shape first yoke 8', which form an explosion-proof container, are threaded together so that an internal chamber is formed. A cylindrical second yoke 10' is hung, through a permanent magnet 14', from the ceiling of the bowl-shaped yoke 8' in th internal chamber. An annular coil winding 11' is arranged, through a fixture plate 22', in the circular gap formed between the bowl-shaped yoke 8' and the cylindrical yoke 10'. An opening 40 is formed through the two yokes 8', 10', the magnet 14', and the center of the top wall of the yoke 8', an the output stem 21' is perpendicularly installed through the opening 40 from the fixture plate 22', to the outside of the yoke 8' leaving the fixed explosion-proof gap "d". The fixture plate 22' of the coil winding 11' is supported elastically by means of a flat spring 24 shown in FIG. 2 and by a pair of electrical lead plate springs 15A' and 15B'. The pair of the lead plate springs 15A' and 15B' are arranged symmetrically, and one end of each spring 15A' and 15B' is attached to a respective position on the bottom surface of the bowl-shaped yoke 8'. One end of each of the lead wires 16A' and 16B', and each electrical lead of the coil winding 11' are connected to the springs 15A' and 15B', respectively. The other ends of the lead wires 16A', 16B' are connected to the outside of the lid 13' through electrically insulating and airtight glass feedthrough beads 38A' and 38B', respectively. In the embodiment shown in FIG. 5, a seat mount 39 is not installed directly on the circular side of the bowl-shaped yoke 8 and, the omission of the lid 13' is not possible while maintaining the explosion-proofing of the mount base 1.

Figure 7:
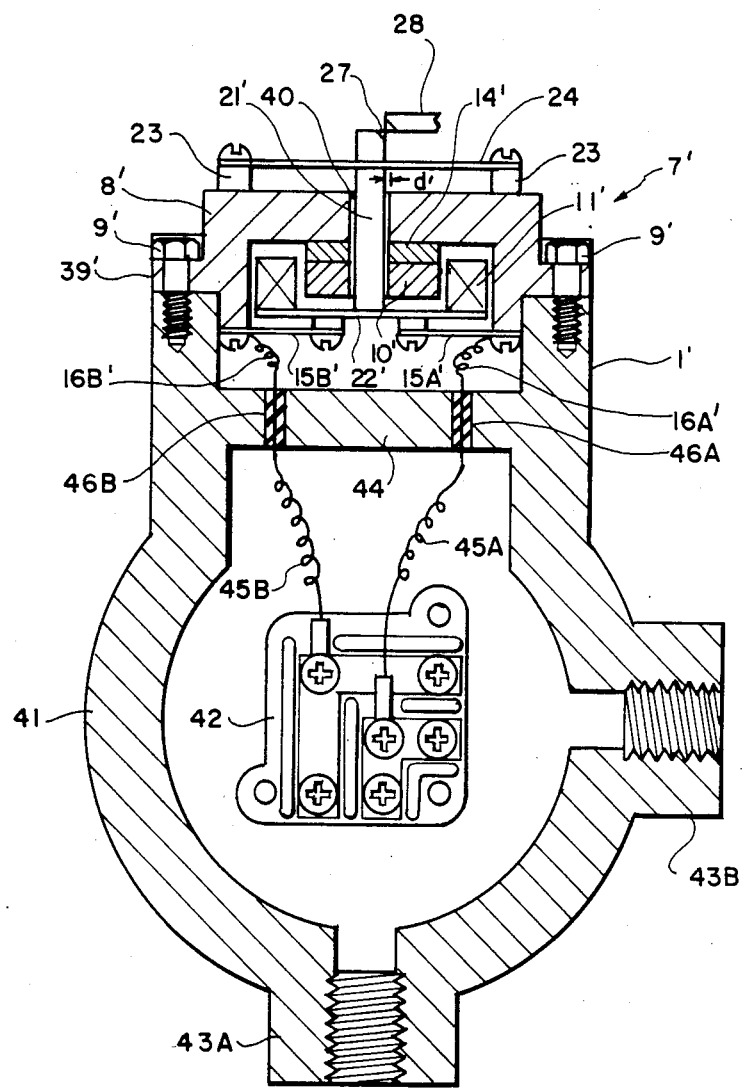
FIG. 7 is a cross-sectional illustration of a converter device according to the present invention and omitting a separate lid as shown in FIGS. 1 and 5.

FIG. 7 shows an example of the omission of the lid 13 or 13' in the above embodiments. In this example, the electro/displacement converter device 7' uses the same parts with the exception of the lid 13' of FIG. 5, and the mount seat 39' on the mount base 1' is integral with the yoke 8'. The mount base 1' is shown integrated to and projected from a terminal box 41. The terminal box 41 is provided with an internal terminal board 42 and with the required number of the openings 43A and 43B for receiving the external wiring to be connected to the terminal board 42. On the other hand, the openings formed in the mount base 1' are separated by the wall 44, and the lead wires 45A and 45B, which are electrically connected to the terminal board 42, and the lead wires 16A' and 16B' of the coil 11' are connected respectively through the electrically insulating and airtight glass feedthrough beads 46A and 46B in the wall 44. The explosion-proof construction of the internal chamber of the electro/displacement converter device 7' in accordance with the above structure will be completed when the device is combined with the terminal box 41 by the bolts 9'. Although the foregoing descriptions were made as to applications for an electropneumatic positioner and an electropneumatic converter, the present invention is not necessarily limited to the above and is applicable to various other factory equipments requiring explosion-proof devices.

In summary, in the explosion-proof type electro/displacement converter device in accordance with the present invention, the bowl-shaped yoke and the lid means which seals the opening of this bowl-shaped yoke form an explosion-proof chamber. The output stem which works in connection with the internal coil winding is projected to the outside of the chamber through the opening which penetrates, leaving an explosion-proof gap, through the center part of the yoke and the lid material. It is possible to facilitate simplified manufacture and to achieve cost reduction because the structure of an explosion-proof container itself is simplified and no special explosion-proof sealed container is required. Since the volume of an internal chamber formed by a bowl-shaped yoke and a lid means is minimized if the lid means is placed directly against the opening of a bowl-shaped yoke, it is easier to cope with the explosion-proof standard for applying explosion-proof requirements which generally becomes more severe as the internal volume of an equipment is increased.

Accordingly, it may be seen that there has been provided, in accordance with the present invention, an improved explosion-proof type electro-displacement converter device.

The embodiments of the present invention in which an exclusive property or privilege is claimed are defined as follows:

1. An explosion-proof type electro-displacement converter device comprising;
    a bowl-shaped first yoke,
    a permanent magnet located at the center of said first yoke,
    a cylindrical second yoke attached to said first yoke through said permanent magnet,
    an exciter coil winding arranged in a magnetic path between said yokes,
    spring means elastically supporting said winding,
    sealing means for sealing an end of said first yoke,
    an opening through said sealing means and
    an output stem linked with said exciter coil winding and projecting through said opening which penetrates through said said sealing means while leaving an explosion-proof gap therebetween.

2. A device as set forth in claim 1 wherein said sealing means is a lid threaded onto said first yoke.

3. A device as set forth in claim 2 wherein said lid includes integral mount means for said device.

4. A device as set forth in claim 1 wherein said spring means serve as electrical conductors to said exciter coil winding.

5. A device as set forth in claim 1 wherein said magnet is a disc having oppositely magnetized faces.

6. A device as set forth in claim 1 wherein said spring means includes coil springs.

7. A device as set forth in claim 1 wherein said spring means includes flat springs.

8. An explosion-proof type electro-displacement converter device comprising:
    a bowl-shaped first yoke,
    a permanent magnet located at the center of said first yoke,
    a cylindrical second yoke attached to said first yoke through said permanent magnet,
    an exciter coil winding arranged in a magnetic path between said yokes,
    spring means elastically supporting said winding,
    an opening through said first yoke, and
    an output stem linked with said exciter coil winding and projecting through said opening while leaving an explosion-proof gap therebetween.

9. A device as set forth in claim 8 wherein said spring means serve as electrical conductors to said exciter coil winding.

10. A device as set forth in claim 9 wherein said first yoke includes integral mount means for said device.

11. A device as set forth in claim 8 wherein said first yoke means includes integral mount means for said device.

12. A device as set forth in claim 8 wherein said stem projects through said magnet.

* * * * *